United States Patent
Wichmann et al.

(10) Patent No.: US 8,347,600 B2
(45) Date of Patent: Jan. 8, 2013

(54) POWER PLANT AND METHOD OF OPERATION

(75) Inventors: Lisa Anne Wichmann, Greenville, SC (US); Daniel David Snook, Greenville, SC (US); Noémie Dion Ouellet, Greenville, SC (US); Scott Allen Rittenhouse, Columbus, IN (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/217,713

(22) Filed: Aug. 25, 2011

(65) Prior Publication Data
US 2012/0023963 A1 Feb. 2, 2012

(51) Int. Cl.
*F02C 6/00* (2006.01)
(52) U.S. Cl. ........ 60/39.52; 60/772; 60/785; 60/39.182; 60/792; 60/39.15
(58) Field of Classification Search ............... 60/39.15, 60/39.182, 39.52, 772, 785, 792
See application file for complete search history.

(56) References Cited

U.S. PATENT DOCUMENTS

| | | | |
|---|---|---|---|
| 2,621,475 A | 12/1952 | Loy | |
| 2,646,663 A | 7/1953 | Sedille | |
| 3,685,287 A | 8/1972 | Dooley | |
| 3,771,969 A | 11/1973 | Scheitlin | |
| 3,866,411 A | 2/1975 | Marion et al. | |
| 3,875,380 A | 4/1975 | Rankin | |
| 3,949,548 A | 4/1976 | Lockwood, Jr. | |
| 4,267,692 A | 5/1981 | Earnest | |
| 4,271,664 A | 6/1981 | Earnest | |
| 4,313,300 A | 2/1982 | Wilkes et al. | |
| 4,330,038 A | 5/1982 | Soukup et al. | |
| 4,434,613 A | 3/1984 | Stahl | |
| 4,492,085 A | 1/1985 | Stahl et al. | |
| 4,528,811 A | 7/1985 | Stahl | |
| 4,533,314 A | 8/1985 | Herberling | |

(Continued)

FOREIGN PATENT DOCUMENTS

EP 1731833 A1 12/2006
(Continued)

OTHER PUBLICATIONS

Disclosure Under 37 C.F.R. § 1.56 dated Apr. 13, 2012 for U.S. Appl. No. 13/217,713.

(Continued)

*Primary Examiner* — Ehud Gartenberg
*Assistant Examiner* — Steven Sutherland
(74) *Attorney, Agent, or Firm* — Sutherland Asbill & Brennan LLP

(57) ABSTRACT

At least one main air compressor makes a compressed ambient gas flow. The compressed ambient gas flow is delivered to both master and slave turbine combustors at a pressure that is greater than or substantially equal to an output pressure delivered to each turbine combustor from each turbine compressor as at least a first portion of a recirculated gas flow. A fuel stream is delivered to each turbine combustor, and combustible mixtures are formed and burned, forming the recirculated gas flows. A master and slave turbine power are produced, and each is substantially equal to at least a power required to rotate each turbine compressor. At least a portion of the recirculated gas flow is recirculated through recirculation loops. At least a second portion of the recirculated gas flow bypasses the combustors or an excess portion of each recirculated gas flow is vented or both.

20 Claims, 2 Drawing Sheets

U.S. PATENT DOCUMENTS

| | | |
|---|---|---|
| 4,561,245 A | 12/1985 | Ball |
| 4,566,267 A | 1/1986 | Muller et al. |
| 5,165,606 A | 11/1992 | Pelet |
| 5,341,636 A | 8/1994 | Paul |
| 5,361,576 A | 11/1994 | Muller |
| 5,400,587 A | 3/1995 | Keler et al. |
| 5,426,932 A | 6/1995 | Morihara et al. |
| 5,557,919 A | 9/1996 | Althaus |
| 5,564,896 A | 10/1996 | Beeck et al. |
| 5,584,182 A | 12/1996 | Althaus et al. |
| 5,595,059 A * | 1/1997 | Huber et al. ............... 60/780 |
| 5,674,066 A | 10/1997 | Hausermann et al. |
| 5,724,805 A | 3/1998 | Golomb et al. |
| 5,794,431 A | 8/1998 | Utamura et al. |
| 5,809,768 A | 9/1998 | Uematsu et al. |
| 5,822,992 A | 10/1998 | Dean |
| 6,050,082 A | 4/2000 | Leonard et al. |
| 6,082,093 A | 7/2000 | Greenwood et al. |
| 6,105,362 A | 8/2000 | Ohtomo |
| 6,202,400 B1 | 3/2001 | Utamura et al. |
| 6,256,976 B1 | 7/2001 | Kataoka et al. |
| 6,269,624 B1 | 8/2001 | Frutschi et al. |
| 6,289,666 B1 | 9/2001 | Ginter |
| 6,338,240 B1 | 1/2002 | Endo et al. |
| 6,363,709 B2 | 4/2002 | Kataoka et al. |
| 6,430,915 B1 | 8/2002 | Wiant et al. |
| 6,622,470 B2 | 9/2003 | Viteri et al. |
| 6,637,183 B2 | 10/2003 | Viteri et al. |
| 6,848,249 B2 | 2/2005 | Coleman et al. |
| 6,851,266 B2 | 2/2005 | Liebig |
| 6,868,677 B2 | 3/2005 | Viteri et al. |
| 6,910,335 B2 | 6/2005 | Viteri et al. |
| 7,007,487 B2 | 3/2006 | Belokon et al. |
| 7,032,388 B2 | 4/2006 | Healy |
| 7,089,743 B2 | 8/2006 | Frutschi et al. |
| 7,127,898 B2 | 10/2006 | Healy |
| 7,383,686 B2 | 6/2008 | Aycock et al. |
| 7,490,472 B2 | 2/2009 | Lynghjem et al. |
| 7,503,178 B2 | 3/2009 | Bucker et al. |
| 7,516,609 B2 | 4/2009 | Agnew |
| 7,726,114 B2 | 6/2010 | Evulet |
| 7,739,864 B2 | 6/2010 | Finkenrath et al. |
| 7,895,822 B2 | 3/2011 | Hoffmann et al. |
| 2003/0051481 A1 | 3/2003 | Priestley et al. |
| 2004/0011057 A1 | 1/2004 | Huber |
| 2004/0134194 A1 | 7/2004 | Roby et al. |
| 2004/0200205 A1 | 10/2004 | Frutschi et al. |
| 2005/0028529 A1 | 2/2005 | Bartlett et al. |
| 2005/0150229 A1 | 7/2005 | Baer et al. |
| 2007/0006592 A1 | 1/2007 | Balan et al. |
| 2007/0034171 A1 | 2/2007 | Griffin et al. |
| 2007/0125063 A1 * | 6/2007 | Evulat ............... 60/39.15 |
| 2007/0125064 A1 | 6/2007 | Sonoda et al. |
| 2007/0125091 A1 * | 6/2007 | Roby et al. ............... 60/776 |
| 2007/0220896 A1 | 9/2007 | Varatharajan et al. |
| 2008/0010967 A1 | 1/2008 | Griffin et al. |
| 2008/0104938 A1 | 5/2008 | Finkenrath et al. |
| 2008/0104939 A1 | 5/2008 | Hoffmann et al. |
| 2008/0120960 A1 | 5/2008 | Agnew |
| 2008/0309087 A1 | 12/2008 | Evulet et al. |
| 2009/0199566 A1 | 8/2009 | Lebas et al. |
| 2009/0218821 A1 | 9/2009 | Elkady et al. |
| 2009/0280003 A1 | 11/2009 | Schriner et al. |
| 2009/0284013 A1 * | 11/2009 | Anand et al. ............... 290/52 |
| 2009/0301054 A1 | 12/2009 | Simpson et al. |
| 2010/0018218 A1 | 1/2010 | Riley et al. |
| 2010/0115960 A1 | 5/2010 | Brautsch et al. |
| 2010/0126181 A1 | 5/2010 | Ranasinghe et al. |
| 2010/0170218 A1 | 7/2010 | Eluripati et al. |
| 2010/0180565 A1 * | 7/2010 | Draper ............... 60/39.52 |
| 2011/0067408 A1 | 3/2011 | Maly et al. |
| 2011/0138766 A1 | 6/2011 | Elkady et al. |
| 2011/0289898 A1 | 12/2011 | Hellat et al. |

FOREIGN PATENT DOCUMENTS

| | | |
|---|---|---|
| EP | 2078827 A1 | 7/2009 |
| EP | 2206959 A2 | 7/2010 |

OTHER PUBLICATIONS

Supplemental Disclosure under 37 CFR 1.56 for U.S. Appl. No. 13/217,713, filed Oct. 31, 2012.

* cited by examiner

POWER PLANT AND METHOD OF OPERATION

BACKGROUND OF THE INVENTION

The subject matter of the present disclosure relates generally to the field of electric power plants, and more particularly to methods of operating stoichiometric exhaust gas recirculation turbine systems. Various types of gas turbine systems are known and in use for electricity generation in power plants. Typically, the gas turbine systems include a turbine compressor for compressing an air flow and a turbine combustor that combines the compressed air with a fuel and ignites the mixture to generate an exhaust gas. The exhaust gas may then be expanded through a turbine, thereby causing the turbine to rotate, which in turn may be connected to a turbine generator via a turbine shaft, for power generation. Gas turbines have traditionally used excess air within the combustion process to control turbine temperatures and manage undesirable emissions. This often results in an exhaust stream with large amounts of excess oxygen.

Accordingly, there exists a need for a power plant arrangement that uses a gas turbine system that may operate without an exhaust stream with large amounts of excess oxygen. Furthermore, it would be desirable for the power plant arrangement to provide for the option to further reduce emissions through treatment of exhaust gases and/or to recover streams of carbon dioxide, nitrogen, and water.

BRIEF DESCRIPTION OF THE INVENTION

In one aspect, a method for operating a power plant at constant speed no load is provided. Ambient air is compressed with at least one main air compressor to make a compressed ambient gas flow. At least a first portion of the compressed ambient gas flow having a first compressed ambient gas flow rate is delivered from the at least one main air compressor to a master turbine combustor at a pressure that is greater than or substantially equal to an output pressure delivered to the master turbine combustor from a master turbine compressor as at least a first portion of a master recirculated gas flow having a master recirculated gas flow rate. At least a second portion of the of the compressed ambient gas flow having a second compressed ambient gas flow rate is delivered from the at least one main air compressor to at least one slave turbine combustor at a pressure that is greater than or substantially equal to an output pressure delivered to the at least one slave turbine combustor from the at least one slave turbine compressor as at least a first portion of a slave recirculated gas flow having at least one slave recirculated gas flow rate. A master fuel stream is delivered to the master turbine combustor with a master fuel flow rate, wherein the master fuel flow rate, the first compressed ambient gas flow rate, and the master recirculated gas flow rate are sufficient to maintain combustion. At least one slave fuel stream is delivered to the at least one slave turbine combustor with at least one slave fuel flow rate, wherein the at least one slave fuel flow rate, the second compressed ambient gas flow rate, and the slave recirculated gas flow rate are sufficient to maintain combustion. At least a first portion of the compressed ambient gas flow is mixed with the at least a first portion of a master recirculated gas flow and with the master fuel stream in the master turbine combustor to form a master combustible mixture. At least a second portion of the compressed ambient gas flow is mixed with the at least a first portion of the at least one slave recirculated gas flow and with the at least one slave fuel stream in the at least one slave turbine combustor to form at least one slave combustible mixture. The master combustible mixture in the master turbine is burned to form the master recirculated gas flow. The at least one slave combustible mixture in the at least one slave turbine is burned to form the at least one slave recirculated gas flow. A master turbine connected to the master turbine compressor is driven using the master recirculated gas flow, such that the master turbine and a master turbine compressor rotate, and produce a master turbine power that is substantially equal to at least a power required to rotate the master turbine compressor. At least one slave turbine connected to the at least one slave turbine compressor is driven using the at least one slave recirculated gas flow, such that the at least one slave turbine and at least one slave turbine compressor rotate, and produce at least one slave turbine power that is substantially equal to a power required to rotate the at least one slave turbine compressor. At least a portion of the master recirculated gas flow is recirculated through a master recirculation loop, wherein the at least a portion of the master recirculated gas flow is recirculated from the master turbine to the master turbine compressor. At least a portion of the at least one slave recirculated gas flow is recirculated through at least one slave recirculation loop, wherein the at least a portion of the at least one slave recirculated gas flow is recirculated from the at least one slave turbine to the at least one slave turbine compressor. The master turbine combustor is bypassed with at least a second portion of the master recirculated gas flow as a master bypass flow having a master bypass flow rate and the master bypass flow rate is adjusted or an excess portion of the master recirculated gas flow is vented between an output of the master turbine compressor and an input to the master turbine compressor. The at least one slave turbine combustor is bypassed with at least a second portion of the at least one slave recirculated gas flow as at least one slave bypass flow having at least one slave bypass flow rate and the at least one slave bypass flow rate is adjusted or an excess portion of the at least one slave recirculated gas flow is vented between an output of the at least one slave turbine compressor and an input to the at least one slave turbine compressor or both.

In another aspect, a method of operating a power plant is provided. Ambient air is compressed with at least one main air compressor to make a compressed ambient gas flow. At least a first portion of the compressed ambient gas flow is delivered from the at least one main air compressor to a master turbine combustor. At least a second portion of the compressed ambient gas flow is delivered from the at least one main air compressor to at least one slave turbine combustor. The at least a first portion of the compressed ambient gas flow is mixed with at least a first portion of a master recirculated gas flow and with a master fuel stream, to form a master combustible mixture in the master turbine combustor. The at least a second portion of the compressed ambient gas flow is mixed with at least a first portion of at least one slave recirculated gas flow and with at least one slave fuel stream, to form at least one slave combustible mixture in the at least one slave turbine combustor. The master combustible mixture in the master turbine combustor is burned to form the master recirculated gas flow. The at least one slave combustible mixture in the at least one slave turbine combustor is burned to form the at least one slave recirculated gas flow. The master turbine connected to the master turbine combustor is driven using the master recirculated gas flow, such that the master turbine and a master turbine compressor rotate, and produce a master turbine power. The at least one slave turbine connected to the at least one slave turbine combustor is driven using the at least one slave recirculated gas flow, such that the at least one slave turbine and at least one slave turbine compressor rotate, and produce at least one slave turbine power.

At least a portion of the master recirculated gas flow is recirculated through a master recirculation loop, wherein the at least a portion of the master recirculated gas flow is recirculated from the master turbine to the master turbine compressor. At least a portion of the at least one slave recirculated gas flow is recirculated through at least one slave recirculation loop, wherein the at least a portion of the at least one slave recirculated gas flow is recirculated from the at least one slave turbine to the at least one slave turbine compressor. The master turbine combustor is bypassed with at least a second portion of the master recirculated gas flow as a master bypass flow having a master bypass flow rate and the master bypass flow rate is adjusted or an excess portion, if any, of the master recirculated gas flow is vented between an output of the master turbine compressor and an input to the master turbine compressor or both. The at least one slave turbine combustor is bypassed with at least a second portion of the at least one slave recirculated gas flow as at least one slave bypass flow having at least one slave bypass flow rate and the at least one slave bypass flow rate is adjusted or an excess portion of the at least one slave recirculated gas flow is vented between an output of the at least one slave turbine compressor and an input to the at least one slave turbine compressor or both.

Additional aspects will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

These and other features, aspects, and advantages of the present invention will become better understood when the following detailed description is read with reference to the accompanying drawings, where the components are not necessarily to scale, and in which corresponding reference numerals designate corresponding parts throughout the drawings, wherein.

DETAILED DESCRIPTION OF THE INVENTION

Figure 1:
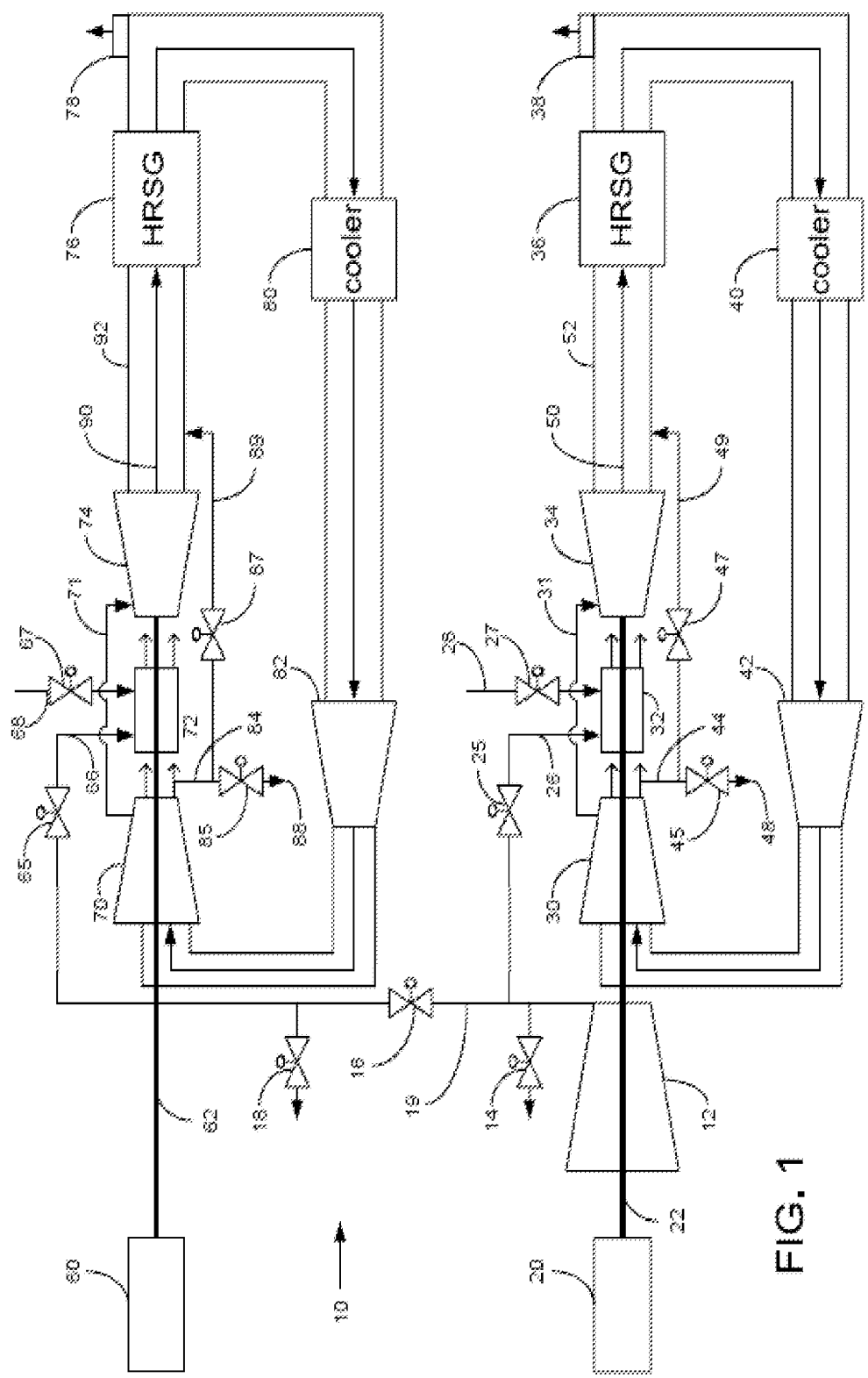
FIG. 1 is a diagrammatical illustration of an exemplary power plant arrangement 10 in accordance with an embodiment of the present invention.

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment," "an embodiment," or "embodiments" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Recent requirements in the power generation industry have necessitated the development of a gas turbine arrangement that may be configured to consume substantially all of the oxygen in the air working fluid to produce an essentially oxygen-free exhaust stream. Such an exhaust stream may be more easily suited to emissions reductions using $NO_x$ catalysts. Additionally, such an exhaust stream may be better suited to post combustion carbon capture solutions due to the low oxygen concentrations. Furthermore, a largely oxygen-free exhaust stream may be more easily suited to enhanced oil recovery applications.

A substantially oxygen-free exhaust from a gas turbine may be accomplished by stoichiometric burning in the combustion system. That is, the oxygen-containing fresh air supply may be matched to the fuel flow such that the combustion process operates at near combustion stoichiometry.

A stoichiometric combustion reaction of methane and oxygen is illustrated below:

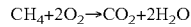

Stoichiometric combustion may result in gas temperatures much too high for the materials and cooling technology employed in gas turbine engines. In order to reduce those high temperatures, a portion of the gas turbine exhaust products may be recirculated back to the combustion system to dilute the combustion temperatures. Ideally, this diluent gas should also be significantly oxygen free so as to not introduce additional oxygen into the system and thereby reduce the advantages of stoichiometric combustion. The gas turbine application using stoichiometric combustion and recirculated exhaust gas is referred to as Stoichiometric Exhaust Gas Recirculation (SEGR).

The SEGR system may use a supply of high pressure air fed directly into the combustion process to provide the oxygen for combustion. This air may be supplied by an auxiliary compressor. In practice, the ability of an auxiliary compressor to provide air at the pressure and flow rate required by the SEGR gas turbine will not be matched across all operating ranges of load and ambient temperature experienced by the system. The auxiliary compressor may allow the compressor to provide more air at times than is required by the gas turbine. Further, the auxiliary compressor may be designed with the capability to always provide more air than is required by the gas turbine. It some situations, it may be necessary to discharge some of the air compressed by the auxiliary compressor to the atmosphere.

As discussed in detail below, embodiments of the present invention may function to minimize emissions in gas turbine power plant systems by using an SEGR cycle that may enable substantially stoichiometric combustion reactions for power production. The SEGR gas turbine may be configured so as to provide a low oxygen content exhaust. This low oxygen content exhaust may be used with an $NO_x$ reduction catalyst to provide an exhaust stream that may also be free of $NO_x$ contaminants.

Embodiments of the present invention include the ability to start up a gas turbine power plant that may use an SEGR cycle by first bringing the one or more gas turbines of the power plant up to constant speed no load operation. As used herein, the term "constant speed no load" means operating a gas turbine at a constant rotational speed (e.g., >1000 rpm) and producing enough power to operate at least the turbine compressor without any applied electrical load from an attached generator unit. In some embodiments, a gas turbine operating at constant speed no load may have a turbine that is running at full speed but that may not be connected to a power grid.

Power Plant Arrangement

Turning now to the drawings and referring first to FIG. 1 an exemplary power plant arrangement 10 is illustrated. The exemplary power plant arrangement 10 may include a main air compressor 12 for compressing ambient air into at least a first portion of a compressed ambient gas flow 26. In some embodiments, the at least a first portion of the compressed ambient gas flow 26 may be vented to the atmosphere via a master variable bleed valve 14. Further, the power plant arrangement 10 may include a master turbine combustor 32 that may be fluidly connected to the main air compressor 12. The flow of the at least a first portion of the compressed ambient gas flow 26 to the master turbine combustor 32 may be regulated by a master air injection valve 25.

The master turbine combustor 32 may be configured to receive the at least a first portion of the compressed ambient gas flow 26 from the main air compressor 12, a master recirculated gas flow 50 from a master turbine compressor 30, and a master fuel stream 28, to form a master combustible mixture and to burn the master combustible mixture to generate the master recirculated gas flow 50. In some embodiments, the master fuel stream 28 may be regulated by a master gas control valve 27 to deliver a master fuel flow rate. In addition, the exemplary power plant arrangement 10 may include a master turbine 34 located downstream of the master turbine combustor 32. The master turbine 34 may be configured to expand the master recirculated gas flow 50 and may drive an external load such as a master turbine generator 20 via a master turbine shaft 22 to generate electricity. In the embodiment shown by FIG. 1, the main air compressor 12 and the master turbine compressor 30 may be driven by the power generated by the master turbine 34 via the master turbine shaft 22.

In some embodiments, the main air compressor 12 may further comprise adjustable inlet guide vanes to control the flow of air into the main air compressor 12. The inlet guide vanes of the main air compressor may be used to regulate the flow and the pressure of the at least a first portion of the compressed ambient gas flow 26 that is delivered to the master turbine combustor 32. In some embodiments, the master turbine compressor 30 may further comprise adjustable inlet guide vanes to control the flow of air into the master turbine compressor 30. The inlet guide vanes of the master turbine compressor 30 may be used to regulate the output pressure and the flow delivered to the master turbine combustor 32 from the master turbine compressor 30 as the at least a first portion of the master recirculated gas flow 50.

As used herein, the term "master recirculated gas flow" refers to the gas flow generated by the burning of the master combustible mixture in the master turbine combustor 32 and flowing through a master recirculation loop 52. In some embodiments, the master recirculated gas flow 50 may have a low oxygen content. As used herein, the term "low oxygen content" refers to an oxygen content of below about 5 vol %, below about 2 vol %, or below about 1 vol %.

As used herein, the term "gas turbine assembly" refers to all listed components of the power plant arrangements except for the main air compressor 12. In embodiments comprising multiple main air compressors, the term "gas turbine assembly" refers to all listed components of the power plant arrangements except for the multiple main air compressors.

In some embodiments, the master recirculated gas flow 50 may be directed from the master turbine combustor 32 through the master recirculation loop 52 to a master heat recovery steam generator 36 for the generation of steam. A master steam turbine may further be configured to generate additional electricity using the steam from the master heat recovery steam generator 36, and the master steam turbine may be connected to a master steam generator. In some embodiments, the master heat recovery steam generator 36, in conjunction with the master steam turbine and the master steam generator, may be configured to generate additional electricity when the temperature of the master recirculated gas flow 50 is in the range from about 200° C. to about 700° C., from about 260° C. to about 600° C., or from about 300° C. to about 550° C. In some embodiments, the master steam turbine may be arranged to be connected to the master turbine shaft 22. The master recirculated gas flow 50 may then be directed back into the master recirculation loop 52 to a master recirculated gas flow cooler 40. In still other embodiments, the master recirculation loop 52 may not contain a master heat recovery steam generator 36 and the master recirculated gas flow 50 may instead be introduced directly into the master recirculated gas flow cooler 40 upon exit from the master turbine 34. In other embodiments, the master recirculation loop 52 may not comprise the master recirculated gas flow cooler 40.

The master recirculated gas flow cooler 40 may be incorporated into the master recirculation loop 52 anywhere downstream of the master turbine 34. The master recirculated gas flow cooler 40 may be configured to lower the temperature of the master recirculated gas flow 50 to a suitable temperature for downstream delivery into the master turbine compressor 30 via the master recirculation loop 52. In some embodiments, a suitable temperature may be below about 66° C., below about 49° C., or below about 45° C.

In some embodiments, a master blower 42 may be fluidly connected to the master recirculation loop 52 upstream of the master recirculated gas flow cooler 40. The master blower 42 may be configured to increase the pressure of the master recirculated gas flow 50 prior to delivery into the master recirculated gas flow cooler 40 via the master recirculation loop 52.

In some embodiments, the exemplary power plant arrangement 10 may include a master bypass conduit 49 located downstream of the master turbine compressor 30 and may be in fluid connection with a portion of the master recirculated gas flow 50 via a master turbine compressor exhaust 44. In some embodiments, a master bypass flow through the master bypass conduit 49 may be regulated by a master turbine bypass valve 47. The master turbine bypass valve 47 may be used to adjust a master bypass flow rate through the master bypass conduit 49. In some embodiments, the master bypass conduit 49 may be used to bypass the master turbine combustor 32 with at least a second portion of the master recirculated gas flow 50.

In some embodiments, the master bypass flow may be fluidly connected to the master recirculation loop 52 downstream of the master turbine 34. In still other embodiments, a portion of the master bypass flow into the master bypass conduit 49 may be extracted as a master extraction flow 48 and regulated by a master extraction valve 45.

In some embodiments, the master extraction valve 45 may be fluidly connected to the master bypass conduit 49 at a point that is either upstream of or downstream of the master turbine bypass valve 47. In some embodiments, the master bypass extraction valve may be fluidly connected to a secondary process. In some embodiments, the master extraction valve 45 may be fluidly connected to a master gas separation system such as a carbon capture sequestration (CCS) system via the master extraction flow 48. In still other embodiments, the master gas separation system may produce a stream of concentrated carbon dioxide and concentrated nitrogen, both with a low oxygen content.

In some embodiments, a master gas turbine vent to the atmosphere may be in fluid communication with the master gas turbine assembly and may be located anywhere between an output of the master turbine compressor 30 and an input of the master turbine compressor 30. In some embodiments, the power plant arrangement 10 may include a master damper door 38 connected to the master recirculation loop 52. The master damper door 38 may be opened to vent a portion of the master recirculated gas flow 50 to the atmosphere. In some embodiments, an excess portion of the master recirculated gas flow 50 may be vented from the master bypass conduit 49.

In some embodiments, the gas turbine assembly may further comprise a master secondary flow path 31 that may deliver at least a third portion of the master recirculated gas flow 50 from the master turbine compressor 30 to the master turbine 34 as a secondary flow. The secondary flow may be used to cool and to seal the master turbine 34, including individual components of the master turbine 34 such as the turbine shroud, the turbine nozzle, the turbine blade tip, the turbine bearing support housing, and the like. After cooling and sealing the master turbine 34 and any individual master turbine components, the secondary flow may be directed into the master recirculation loop 52 near the output of the master turbine 34.

As illustrated by FIG. 1, in some embodiments, the turbine shaft 22 may be a "cold-end drive" configuration, meaning the turbine shaft 22 may connect to the generator 20 at the compressor end of the turbine assembly. In other embodiments, the turbine shaft 22 may be a "hot-end drive" configuration, meaning the turbine shaft 22 may connect to the generator 20 at the turbine end of the turbine assembly.

As used herein, the term "slave" is synonymous with the terms secondary, auxiliary, or additional. In the following embodiments, the term "slave" refers to the second of two gas turbine assemblies, but can also mean any additional gas turbine assemblies operated with a master gas turbine assembly such as is the second gas turbine assembly in the following embodiments.

In some embodiments, the main air compressor 12 may deliver compressed ambient gas to a slave turbine combustor 72 that may be fluidly connected to the main air compressor 12 via an inter-train conduit 19. The flow of the compressed ambient gas through the inter-train conduit 19 may be further regulated by an inter-train valve 16 to create at least a second portion of a compressed ambient gas flow 66. The at least a second portion of the compressed ambient gas flow 66 may further be vented to the atmosphere via a slave variable bleed valve 18. The flow of the at least a second portion of the compressed ambient gas flow 66 to a slave turbine combustor 72 may be regulated by a slave air injection valve 65.

The slave turbine combustor 72 may be configured to receive the at least a second portion of the compressed ambient gas flow 66 from the main air compressor 12, a slave recirculated gas flow 90 from a slave turbine compressor 70, and a slave fuel stream 68, to form a slave combustible mixture and to burn the slave combustible mixture to generate the slave recirculated gas flow 90. In some embodiments, the slave fuel stream 68 may be regulated by a slave gas control valve 67 to deliver a slave fuel flow rate. In addition, the exemplary power plant arrangement 10 may include a slave turbine 74 located downstream of the slave turbine combustor 72. The slave turbine 74 may be configured to expand the slave recirculated gas flow 90 and may drive an external load such as a slave turbine generator 60 via a slave turbine shaft 62 to generate electricity.

In some embodiments, the slave turbine compressor 70 may further comprise adjustable inlet guide vanes to control the flow of air into the slave turbine compressor 70. The inlet guide vanes of the slave turbine compressor 70 may be used to regulate the output pressure and the flow delivered to the slave turbine combustor 72 from the slave turbine compressor 70 as the slave recirculated gas flow 90.

As used herein, the term "slave recirculated gas flow" refers to the gas flow generated by the burning of the slave combustible mixture in the slave turbine combustor 72 and flowing through a slave recirculation loop 92. In some embodiments, the slave recirculated gas flow 90 may comprise a low oxygen content. As used herein, the term "low oxygen content" refers to an oxygen content of below about 5 vol %, below about 2 vol %, or below about 1 vol %.

In some embodiments, the slave recirculated gas flow 90 may be directed from the slave turbine combustor 72 through the slave recirculation loop 92 to a slave heat recovery steam generator 76 for the generation of steam. A slave steam turbine may be further configured to generate additional electricity using the steam from the slave heat recovery steam generator 76, and the slave steam turbine may be connected to a slave steam generator. In some embodiments, the slave heat recovery steam generator 76, in conjunction with the slave steam turbine and the slave steam generator, may be configured to generate additional electricity when the temperature of the slave recirculated low oxygen content gas flow 90 is in the range from about 200° C. to about 700° C., from about 260° C. to about 600° C., or from about 300° C. to about 550° C. In some embodiments, the slave steam turbine may be arranged to be connected to the slave turbine shaft 62. The slave recirculated gas flow 90 may then be directed back into the slave recirculation loop 92 to a slave recirculated gas flow cooler 80. In still other embodiments, the recirculation loop 92 may not contain a slave heat recovery steam generator 76 and the slave recirculated low oxygen content gas flow 90 may instead be introduced directly into the slave recirculated gas flow cooler 80 upon exit from the slave turbine 74. In some embodiments, the slave recirculation loop 92 may not comprise a slave recirculated gas flow cooler 80.

The slave recirculated gas flow cooler 80 may be incorporated into the slave recirculation loop 92 anywhere downstream from the slave turbine 74. The slave recirculated gas flow cooler 80 may be configured to lower the temperature of the slave recirculated low oxygen content gas flow 90 to a suitable temperature for downstream delivery into the slave turbine compressor 70 via the slave recirculation loop 92. In some embodiments, a suitable temperature may be below about 66° C., below about 49° C., or below about 45° C.

In some embodiments, a slave blower 82 may be fluidly connected to the slave recirculation loop 92 upstream of the slave recirculated gas flow cooler 80. The slave blower 82 may be configured to increase the pressure of the slave recirculated gas flow 90 prior to delivery into the slave turbine compressor 70 via the slave recirculation loop 92.

In some embodiments, the exemplary power plant arrangement 10 may include a slave bypass conduit 89 located downstream of the slave turbine compressor 70 and may be in fluid connection with a portion of the slave recirculated gas flow 90 via a turbine compressor exhaust 84. In some embodiments, a slave bypass flow through the slave bypass conduit 89 may be regulated by a slave turbine bypass valve 87. In some embodiments, a portion of the slave bypass flow into the slave bypass conduit 89 may be extracted as a slave extraction flow 88 and regulated by a slave extraction valve 85. In some embodiments, the slave bypass conduit 89 may be used to bypass the slave turbine combustor 72 with at least a second portion of the slave recirculated gas flow 90.

In some embodiments, the slave bypass flow may be fluidly connected to the slave recirculation loop 92 downstream of the slave turbine 74. In still other embodiments, a portion of the slave bypass flow into the slave bypass conduit 89 may be extracted as a slave extraction flow 88 and regulated by a slave extraction valve 85.

In some embodiments, the slave extraction valve 85 may be fluidly connected to the slave bypass conduit 89 at a point that is either upstream of or downstream of the slave turbine bypass valve 87. In some embodiments, the slave extraction flow 88 may be used for a secondary process. In some embodiments, the slave extraction valve 85 may be fluidly connected to a slave gas separation system such as a carbon capture sequestration (CCS) system via the slave extraction flow 88. In still other embodiments, the slave gas separation system may produce a stream of concentrated carbon dioxide and concentrated nitrogen, both with a low oxygen content.

In some embodiments, a slave gas turbine vent to the atmosphere may be in fluid communication with the slave gas turbine assembly and may be located anywhere between an output of the slave turbine compressor 70 and an input of the slave turbine compressor 70. In some embodiments, the power plant arrangement 10 may include a slave damper door 78 connected to the slave recirculation loop 92. The slave damper door 78 may be opened to vent a portion of the slave recirculated gas flow 90 to the atmosphere. In some embodiments, an excess portion of the slave recirculated gas flow 90 may be vented from the slave bypass conduit 89.

In some embodiments, the gas turbine assembly may further comprise a slave secondary flow path 71 that may deliver at least a third portion of the slave recirculated gas flow 90 from the slave turbine compressor 70 to the slave turbine 74 as a slave secondary flow. The slave secondary flow may be used to cool and to seal the slave turbine 74, including individual components of the slave turbine 74 such as the turbine shroud, the turbine nozzle, the turbine blade tip, the turbine bearing support housing, and the like. After cooling and sealing the slave turbine 74 and any individual slave turbine components, the slave secondary flow may be directed into the slave recirculation loop 92 downstream of the slave turbine 74.

As illustrated by FIG. 1, in some embodiments, the slave turbine shaft 62 may be a "cold-end drive" configuration, meaning the slave turbine shaft 62 may connect to the slave generator 60 at the compressor end of the turbine assembly. In other embodiments, the slave turbine shaft 62 may be a "hot-end drive" configuration, meaning the slave turbine shaft 62 may connect to the slave generator 60 at the turbine end of the turbine assembly.

Figure 2:
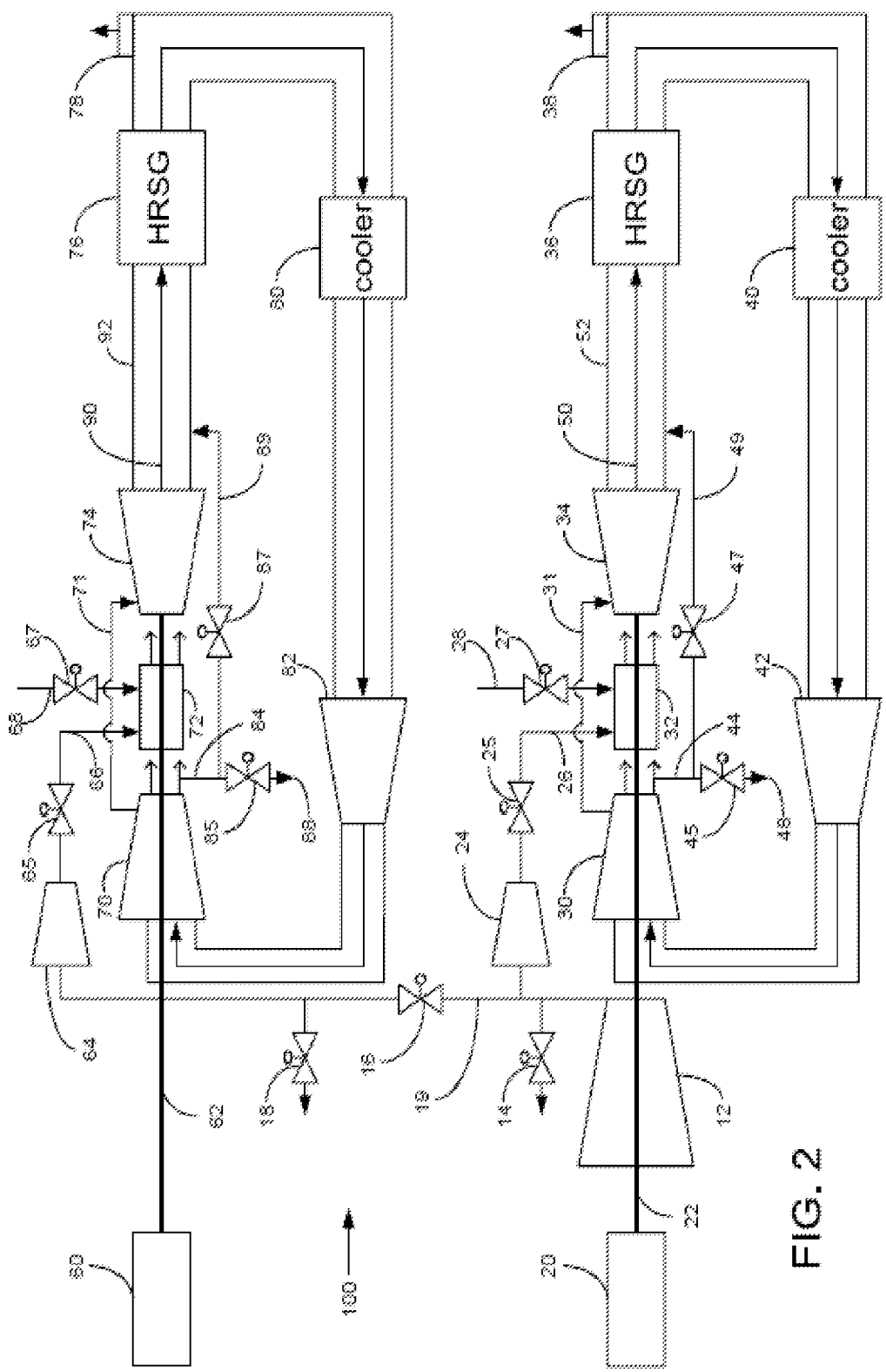
FIG. 2 is a diagrammatical illustration of an exemplary configuration 100 of the exemplary power plant arrangement 10 of FIG. 1 in accordance with an embodiment of the present invention.

FIG. 2 is a diagrammatical illustration of an exemplary configuration 100 of the exemplary power plant arrangement 10 of FIG. 1. As discussed with reference to FIG. 1, a booster compressor 24 may be incorporated downstream of and in fluid connection with the main air compressor 12 and upstream of and in fluid connection with the master turbine combustor 32. The booster compressor 24 may further compress the at least a first portion of the compressed ambient gas flow 26 before delivery into the turbine combustor 32. Similarly, a slave booster compressor 64 may be incorporated downstream of and in fluid connection with the main air compressor 12 and upstream of and in fluid connection with the slave turbine combustor 72. The slave booster compressor 64 may further compress the at least a second portion of the compressed ambient gas flow 66 before delivery into the slave turbine combustor 72.

In some embodiments, the power plant arrangement may comprise two gas turbine assemblies that are fluidly connected by the inter-train conduit 19. As used herein, the term "inter-train conduit" may refer to a fluid connection between two or more gas turbine assemblies and one or more main air compressors. In still other embodiments, the power plant arrangement may comprise three or more gas turbine assemblies and one or more additional main air compressors, wherein the additional main air compressors are in fluid connection with each other and with the gas turbine assemblies. In yet other embodiments, the power plant arrangement may be configured for substantially stoichiometric combustion. In still other embodiments, the power plant arrangement may be configured for substantially zero emissions power production.

In some embodiments, the fuel stream 28 and/or the slave fuel stream 68 may comprise an organic gas, including but not limited to methane, propane, and/or butane. In still other embodiments, the fuel stream 28 and/or the slave fuel stream 68 may comprise an organic liquid, including but not limited to methanol and/or ethanol. In yet other embodiments, the fuel stream 28 and/or the slave fuel stream 68 may comprise a fuel source obtained from a solid carbonaceous material such as coal.

Method for Operating a Power Plant

In one embodiment, a method for operating the exemplary power plant arrangement 10 is provided, wherein the inter-train valve 16 may be open. In operation, ambient air may be compressed with a main air compressor 12 to make at least a first portion of a compressed ambient gas flow 26 and at least a second portion of a compressed ambient gas flow 66. The at least a first portion of the compressed ambient gas flow 26 may be delivered from the main air compressor 12 to the master turbine combustor 32 and may be regulated by a master air injection valve 25. In some embodiments, the at least a first portion of the compressed ambient gas flow 26 may further be regulated by a master variable bleed valve 14.

The at least a first portion of the compressed ambient gas flow 26 may be mixed, in the master turbine combustor 32, with the master recirculated gas flow 50 and with the master fuel stream 28 to form a master combustible mixture. In some embodiments, the master fuel flow rate of the master fuel stream 28 may be regulated by a master gas control valve 27. The master combustible mixture may then ignited and burned in the master turbine combustor 32, thereby forming the master recirculated gas flow 50 and driving both the master turbine 34 and the master turbine compressor 30.

In some embodiments, the at least a second portion of the compressed ambient gas flow 66 may be delivered from the main air compressor 12 to the slave turbine combustor 72 and may be regulated by a slave air injection valve 65. In some embodiments, the at least a second portion of the compressed ambient gas flow 66 may be further regulated by a slave variable bleed valve 18. The at least a second portion of the compressed ambient gas flow 66 may be mixed, in the slave turbine combustor 72, with the slave recirculated gas flow 90 and with the slave fuel stream 68 to form a slave combustible mixture. In some embodiments, the slave fuel flow rate of the slave fuel stream 68 may be regulated by a slave gas control valve 67. The slave combustible mixture may then be ignited and burned in the slave turbine combustor 72, thereby forming the slave recirculated gas flow 90 and driving both the slave turbine 74 and the slave turbine compressor 70.

As used herein, the term "driving" means the expansion of the recirculated gas flow 50 in the turbine 34 thereby causing the turbine 34 to rotate. The master turbine 34 may be connected to the turbine compressor 30 via the turbine shaft 22, and thus rotation of the turbine 34 causes rotation of the turbine compressor 30. The turbine shaft 22 may also rotate in a turbine generator 20 and may further generate electricity. Additionally, the term "driving" also means the expansion of the slave recirculated gas flow 90 in the slave turbine 74 thereby causing the slave turbine 74 to rotate. The slave turbine 74 may be connected to the slave turbine compressor 70 via the slave turbine shaft 62, and thus rotation of the slave turbine 74 causes rotation of the slave turbine compressor 70. The slave turbine shaft 62 may also rotate in a slave turbine generator 60 and may further generate electricity.

In some embodiments, at least a portion of the master recirculated gas flow 50 may be recirculated through a master recirculation loop 52. The master recirculation loop 52 may fluidly connect the output of the master turbine 34 with the input of the master turbine compressor 30. The master recirculated gas flow 50 may further pass through the master heat recovery steam generator 36, the master recirculated gas flow cooler 40, and the master turbine blower 42 en route from the output of the master turbine 34 to the input of the master turbine compressor 30.

In some embodiments, at least a portion of the slave recirculated gas flow 90 may be recirculated through a slave recirculation loop 92. The slave recirculation loop 92 may fluidly connect the output of the slave turbine 74 with the input of the slave turbine compressor 70. The slave recirculated gas flow 90 may further pass through the slave heat recovery steam generator 76, the slave recirculated gas flow cooler 80, and the slave turbine blower 82 en route from the output of the slave turbine 74 to the input of the slave turbine compressor 70.

An excess portion, if any, of the master recirculated gas flow 50 may be vented from the system at a location between an output of the master turbine compressor 30 and an input to the master turbine compressor 30. The venting step may be used to prevent over-pressurization of the master gas turbine assembly. In some embodiments, the venting step may be used to reduce the pressure of the master recirculated gas flow 50 that is delivered from the master turbine compressor 30 to the master turbine combustor 32. In some embodiments, the method of operation may further comprise opening a master damper door 38, which may be fluidly connected to the master recirculation loop 52, to the atmosphere. In some embodiments, an excess portion of the master recirculated gas flow 50 may be vented from the master bypass conduit 49.

An excess portion, if any, of the slave recirculated gas flow 90 may be vented from the system at a location between an output of the slave turbine compressor 70 and an input to the slave turbine compressor 70. The venting step may be used to prevent over-pressurization of the slave gas turbine assembly. In some embodiments, the venting step may be used to reduce the pressure of the slave recirculated gas flow 90 that is delivered from the slave turbine compressor 70 to the slave turbine combustor 72. In some embodiments, the method of operation may further comprise opening a slave damper door 78, which may be fluidly connected to the slave recirculation loop 92, to the atmosphere. In some embodiments, an excess portion of the slave recirculated gas flow 90 may be vented from the slave bypass conduit 89.

In some embodiments, at least a portion of a master turbine compressor exhaust 44 may bypass the master turbine combustor 32 via the master bypass conduit 49. As used herein, the "exhaust" of the master turbine compressor 30 is an output of the master recirculated gas flow 50 from the master turbine compressor 30. A master bypass flow with a master bypass flow rate may be regulated by the master turbine bypass valve 47. Additionally, the master bypass conduit 49 may deliver the master bypass flow to the master recirculation loop 52 downstream of the master turbine 34. In some embodiments, the master bypass conduit 49 may be used to bypass the master turbine combustor 32 with at least a second portion of the master recirculated gas flow 50.

In some embodiments, a portion of the master bypass flow into the master bypass conduit 49 may be extracted as a master extraction flow 48 and may be regulated by a master extraction valve 45. In some embodiments, the master extraction valve 45 may be fluidly connected to the master bypass conduit 49 at a point that is either upstream of or downstream of the master turbine bypass valve 47. In some embodiments, the master extraction flow 48 may be used for one or more secondary processes. In some embodiments, the master extraction flow 48 may be delivered to a master gas separation system. In some embodiments, the master extraction valve 45 may be fluidly connected to a master gas separation system such as a carbon capture sequestration (CCS) system via the master extraction flow 48. In still other embodiments, the master gas separation system may produce a stream of concentrated carbon dioxide and concentrated nitrogen, both with a low oxygen content.

In some embodiments, at least a portion of a slave turbine compressor exhaust 84 may bypass the slave turbine combustor 72 via the slave bypass conduit 89. As used herein, the "exhaust" of the slave turbine compressor 70 is an output of the slave recirculated gas flow 90 from the slave turbine compressor 70. A slave bypass flow with a slave bypass flow rate may be regulated by the slave turbine bypass valve 87. Additionally, the slave bypass conduit 89 may deliver the slave bypass flow to the slave recirculation loop 92 downstream of the slave turbine 74. In some embodiments, the slave bypass conduit 89 may be used to bypass the slave turbine combustor 72 with at least a second portion of the slave recirculated gas flow 90.

In some embodiments, a portion of the slave bypass flow into the slave bypass conduit 89 may be extracted as a slave extraction flow 88 and may be regulated by a slave extraction valve 85. In some embodiments, the slave extraction valve 85 may be fluidly connected to the slave bypass conduit 89 at a point that is either upstream of or downstream of the slave turbine bypass valve 87. In some embodiments, the slave extraction flow 88 may be used for one or more secondary processes. In some embodiments, the slave extraction flow 88 may be delivered to a slave gas separation system. In some embodiments, the slave extraction valve 85 may be fluidly connected to a slave gas separation system such as a carbon capture sequestration (CCS) system via the slave extraction flow 88. In still other embodiments, the slave gas separation system may produce a stream of concentrated carbon dioxide and concentrated nitrogen, both with a low oxygen content.

In some embodiments, the master turbine power generated by the combustion of the master combustible mixture may be used to rotate a master turbine shaft 22 that may be configured to generate electricity when rotated in the master turbine generator 20. In some embodiments, the electricity may be generated using substantially stoichiometric combustion. In some embodiments, the slave turbine power generated by the combustion of the slave combustible mixture may be used to rotate a slave turbine shaft 62 that may be configured to generate electricity when rotated in the slave turbine generator 60. In some embodiments, the electricity may be generated using substantially stoichiometric combustion.

In some embodiments, the master gas turbine assembly may further comprise a master secondary flow path 31 that may deliver at least a third portion of the master recirculated gas flow 50 from the master turbine compressor 30 to the master turbine 34 as a master secondary flow. The master secondary flow may be used to cool and to seal the master turbine 34, including individual components of the master turbine 34 such as the turbine shroud, the turbine nozzle, the turbine blade tip, the turbine bearing support housing, and the like. After cooling and sealing the master turbine 34 and any individual master turbine components, the master secondary flow may be directed into the master recirculation loop 52 downstream of the master turbine 34.

Similarly, in some embodiments the slave gas turbine assembly may further comprise a slave secondary flow path 71 that may deliver at least a third portion of the slave recirculated gas flow 90 from the slave turbine compressor 70 to the slave turbine 74 as a slave secondary flow. The slave secondary flow may be used to cool and to seal the slave turbine 74, including individual components of the slave turbine 74 such as the turbine shroud, the turbine nozzle, the turbine blade tip, the turbine bearing support housing, and the like. After cooling and sealing the slave turbine 74 and any individual slave turbine components, the slave secondary flow may be directed into the slave recirculation loop 92 downstream of the slave turbine 74.

In some embodiments, a method for operating an exemplary power plant configuration 100 is provided and may include the use of the master booster compressor 24 which may be incorporated downstream of and in fluid connection with the main air compressor 12 and upstream of and in fluid connection with the master turbine combustor 32. The master booster compressor 24 may further compress the at least a first portion of the compressed ambient gas flow 26 before delivery into the master turbine combustor 32. The exhaust of the master booster combustor 24 may be delivered to the master turbine combustor 32. In some embodiments, the exhaust of the master booster compressor 24 may be regulated by the master air injection valve 25.

In some embodiments, a method for operating the exemplary power plant configuration 100 is provided and may include the use of the slave booster compressor 64 which may be incorporated downstream of and in fluid connection with the main air compressor 12 and upstream of and in fluid connection with the slave turbine combustor 72. The slave booster compressor 64 may further compress the at least a second portion of the compressed ambient gas flow 66 before delivery into the slave turbine combustor 72. The exhaust of the slave booster combustor 64 may be delivered to the slave turbine combustor 72. In some embodiments, the exhaust of the slave booster compressor 64 may be regulated by the slave air injection valve 65.

Method for Operating a Power Plant at Constant Speed No Load

In another embodiment, a method for operating an exemplary power plant arrangement 10 at constant speed no load is provided, wherein the inter-train valve 16 may be open.

Constant speed no load operation of the master turbine assembly may consider several factors for operation. First, the master power produced by the master turbine 34 should be equal to the power consumed by the main air compressor 12 (if attached to the master turbine shaft 22) plus the power consumed by the master turbine compressor 30. Second, the master exhaust gas temperature of the master gas turbine assembly may be maintained at an appropriate temperature to enable the master heat recovery steam generator 36 to operate. Third, the pressure of the at least a first portion of the compressed ambient gas flow 26 entering the master turbine combustor 32 should be greater than or substantially equal to the pressure of the master recirculated gas flow 50 entering the master turbine combustor 32 from the master turbine compressor 30. Fourth, there should be sufficient oxygen from the combination of the at least of first portion of the compressed ambient gas flow 26 and the master recirculated gas flow 50 such that combustion may proceed in the master turbine combustor 32 without a lean blow-out.

Similarly, constant speed no load operation of the slave turbine assembly may consider several factors for operation. First, the slave power produced by the slave turbine 74 should be equal to the power consumed by the slave turbine compressor 30. Second, the slave exhaust gas temperature of the slave gas turbine assembly may be maintained at an appropriate temperature to enable the slave heat recovery steam generator 76 to operate. Third, the pressure of the at least a second portion of the compressed ambient gas flow 66 entering the slave turbine combustor 72 should be greater than or substantially equal to the pressure of the slave recirculated gas flow 90 entering the slave turbine combustor 72 from the slave turbine compressor 70. Fourth, there should be sufficient oxygen from the combination of the at least a second portion of the compressed ambient gas flow 66 and the slave recirculated gas flow 90 such that combustion may proceed in the slave turbine combustor 72 without a lean blow-out.

Additionally, each element of equipment described above in the section "Power Plant Arrangement" may influence constant speed no load operation. At constant speed no load operation, the master turbine 34 is rotating at a constant speed but the master turbine generator 20 is not engaged to generate electricity. In some embodiments, the main air compressor 12 may have inlet guide vanes set to allow the minimum flow necessary to match or exceed the pressure of the flow from the master turbine compressor 30. In some embodiments, the master turbine compressor 30 may have inlet guide vanes set to allow the minimum flow necessary to provide any necessary remainder flow not provided by the main air compressor 12 to the master turbine combustor 32. The master variable bleed valve 14 may be closed. The inter-train valve 16 is open. The master fuel flow rate of the master fuel stream 28 may be set in conjunction with the combination of the flow rates of the at least a first portion of the compressed ambient gas flow 26 and the master recirculated gas flow 50 to provide sufficient master turbine power through combustion. Additionally, any excess portion of the master recirculated flow 50 may be vented from the master gas turbine assembly so that the master gas turbine assembly does not over-pressurize.

Similarly, each element of equipment described above in the section "Power Plant Arrangement" for the slave gas turbine assembly may influence constant speed no load operation. At constant speed no load operation, the slave turbine 74 is rotating at a constant speed but the slave turbine generator 60 is not engaged to generate electricity. The slave turbine compressor 70 may have inlet guide vanes set to allow the minimum flow necessary to provide any necessary remainder flow not provided by the main air compressor 12 to the slave turbine combustor 72. The slave variable bleed valve 18 may be closed. The slave fuel flow rate of the slave fuel stream 68 may be set in conjunction with the combination of the flow rates of the at least a second portion of the compressed ambient gas flow 66 and the slave recirculated gas flow 90 to provide sufficient slave turbine power through combustion. Additionally, any excess portion of the slave recirculated gas flow 90 may be vented from the slave gas turbine assembly so that the slave gas turbine assembly does not over-pressurize.

In some embodiments, discussed in detail below, a master bypass conduit 49 may be used to "bleed" extra pressure from the master turbine compressor 30 as a master bypass flow. The master bypass flow may be regulated by a master turbine bypass valve 47. The flow across the master turbine 34 may be equal to the flow rate from the master turbine compressor 30 multiplied by one minus the master turbine bypass valve opening percentage, plus the flow rate of the at least a first portion of the compressed ambient gas flow 26 plus the flow rate of the master fuel stream 26. The master turbine power may then be equal to the flow across the master turbine 34 multiplied by the specific work extracted across the master turbine 34. The specific work extracted from the master turbine 34 may be proportional to the pressure and temperature drop across the master turbine 34. The temperature drop across the master turbine section may be influenced by the master turbine 34 inlet temperature, which may be influenced by the fuel flow into the master turbine combustor 32.

Similarly, and as discussed in detail below, in some embodiments, a slave bypass conduit 89 may be used to "bleed" extra pressure from the slave turbine compressor 70 as a slave bypass flow. The slave bypass flow may be regulated by a slave turbine bypass valve 87. The flow across the slave turbine 74 may be equal to the flow rate from the slave turbine compressor 70 multiplied by one minus the slave turbine bypass valve opening percentage, plus the flow rate of the at least a second portion of the compressed ambient gas flow 66 plus the flow rate of the slave fuel stream 66. The slave turbine power may then be equal to the flow across the slave turbine 74 multiplied by the specific work extracted across the slave turbine 74. The specific work extracted from the slave turbine 74 may be proportional to the pressure and temperature drop across the slave turbine 74. The temperature drop across the slave turbine section may be influenced by the slave turbine 74 inlet temperature, which may be influenced by the fuel flow into the slave turbine combustor 72.

In operation, ambient air may be compressed with the main air compressor 12 to make at least a first portion of a compressed ambient gas flow 26 having a first compressed ambient gas flow rate. In some embodiments, the inlet guide vanes to the main air compressor 12 may be used to control the compressed ambient gas flow rate and may be adjusted to a range of about 30° to about 55°, from about 35° to about 50°, or from about 40° to about 45°.

The at least a first portion of the compressed ambient gas flow 26 may be delivered from the main air compressor 12 to the master turbine combustor 32 and the flow may be further regulated by a master air injection valve 25. In some embodiments, the flow of the at least a first portion of the compressed ambient gas flow 26 may additionally be regulated by the master variable bleed valve 14. The first compressed ambient gas flow rate may be adjusted to control the pressure at which the first portion of the compressed ambient gas flow 26 is delivered to the master turbine combustor 32.

Ambient air may also be compressed with the main air compressor 12 to provide at least a second portion of a compressed ambient gas flow 66 having a second compressed ambient gas flow rate. The at least a second portion of the compressed ambient gas flow 66 may be delivered from the main air compressor 12 to the slave turbine combustor 72 and the flow may be further regulated by a slave air injection valve 65. In some embodiments, the flow of the at least a second portion of the compressed ambient gas flow 66 may additionally be regulated by the slave variable bleed valve 18. The second compressed ambient gas flow rate may be adjusted to control the pressure at which the second portion of the compressed ambient gas flow 66 is delivered to the slave turbine combustor 72.

The at least a first portion of the compressed ambient gas flow 26 may be delivered from the main air compressor 12 to the master turbine combustor 32 at a pressure that is greater than or substantially equal to an output pressure that is delivered to the master turbine combustor 32 from a master turbine compressor 30 as at least a first portion of a master recirculated gas flow 50 having a master recirculated gas flow rate. A master fuel stream 28 may also be delivered to the master turbine combustor 32 with a master fuel flow rate. In embodiments, the master fuel flow rate, the first compressed ambient gas flow rate, and the master recirculated gas flow rate may be sufficient to maintain combustion in the master turbine combustor 32.

The at least a second portion of the compressed ambient gas flow 66 may be delivered from the main air compressor 12 to the slave turbine combustor 72 at a pressure that is greater than or substantially equal to an output pressure that is delivered to the slave turbine combustor 72 from a slave turbine compressor 70 as at least a first portion of a slave recirculated gas flow 90 having a slave recirculated low oxygen content gas flow rate. A slave fuel stream 68 may also be delivered to the slave turbine combustor 72 with a slave fuel flow rate. In embodiments, the slave fuel flow rate, the second compressed ambient gas flow rate, and the slave recirculated gas flow rate may be sufficient to maintain combustion in the slave turbine combustor 72.

The at least a first portion of a master recirculated gas flow 50 has a flow rate that may be adjusted. Adjusting the flow rate of the at least a first portion of the master recirculated gas flow 50 may control the output pressure that is delivered from the master turbine compressor 30 to the master turbine combustor 32. In some embodiments, the inlet guide vanes of the master turbine compressor 30 may be used to adjust the master recirculated low oxygen content gas flow rate. In some embodiments, the inlet guide vanes of the master turbine compressor 30 may be adjusted to a range of about 35° to about 65°, about 40° to about 60°, or about 45° to about 55°.

The at least a first portion of a slave recirculated gas flow 90 has a flow rate that may be adjusted. Adjusting the flow rate of the at least a first portion of the slave recirculated gas flow 90 may control the output pressure that is delivered from the slave turbine compressor 70 to the slave turbine combustor 72. In some embodiments, the inlet guide vanes of the slave turbine compressor 70 may be used to adjust the slave recirculated gas flow rate. In some embodiments, the inlet guide vanes of the slave turbine compressor 70 may be adjusted to a range of about 35° to about 65°, about 40° to about 60°, or about 45° to about 55°.

The master fuel flow rate of the master fuel stream 28 may be regulated by a master gas control valve 27 to give a master fuel flow rate in the range of about 10 pps to about 30 pps, about 15 pps to about 25 pps, or from about 18 pps to about 22 pps. The slave fuel flow rate of the slave fuel stream 68 may be regulated by a slave gas control valve 27 to give a slave fuel flow rate in the range of about 10 pps to about 30 pps, about 15 pps to about 25 pps, or from about 18 pps to about 22 pps. As used herein, the term "pps" means pounds per second and specifies a flow rate by mass.

The at least a first portion of the compressed ambient gas flow 26 may be mixed, in the master turbine combustor 32, with at least a first portion of the master recirculated gas flow 50 and with the master fuel stream 28 to form a master combustible mixture. The master combustible mixture may then be ignited and burned in the master turbine combustor 32, thereby forming the master recirculated gas flow 50 and driving both the master turbine 34 and the master turbine compressor 30, and producing a master turbine power that is substantially equal to at least the power required to rotate the master turbine compressor 30. As used herein, the term "driving" means that both the master turbine 34 and the master turbine compressor 30 rotate. Thus, the burning of the master combustible mixture may produce a master turbine power that is substantially equal to at least a power required to rotate the master turbine compressor 30.

The at least a second portion of the compressed ambient gas flow 66 may be mixed, in the slave turbine combustor 72, with at least a first portion of the slave recirculated gas flow 90 and with the slave fuel stream 68 to form a slave combustible mixture. The slave combustible mixture may then be ignited and burned in the slave turbine combustor 72, thereby forming the slave recirculated gas flow 90 and driving both the slave turbine 74 and the slave turbine compressor 70, and producing a slave turbine power that is substantially equal to at least the power required to rotate the slave turbine compressor 70. As used herein, the term "driving" means that both the slave turbine 74 and the slave turbine compressor 70 rotate. Thus, the burning of the slave combustible mixture may produce a slave turbine power that is substantially equal to at least a power required to rotate the slave turbine compressor 70.

At least a portion of the master recirculated gas flow 50 may be recirculated through a master recirculation loop 52. The master recirculation loop 52 may fluidly connect an output of the master turbine 34 with an input of the master turbine compressor 30. The master recirculated gas flow 50 may further pass through the master heat recovery steam generator 36, the master recirculated gas flow cooler 40, and the master turbine blower 42 en route from the output of the master turbine 34 to the input of the master turbine compressor 30.

At least a portion of the slave recirculated gas flow 90 may be recirculated through a slave recirculation loop 92. The slave recirculation loop 92 may fluidly connect an output of the slave turbine 74 with an input of the slave turbine compressor 70. The slave recirculated low oxygen content gas flow 90 may further pass through the slave heat recovery steam generator 76, the slave recirculated gas flow cooler 80, and the slave turbine blower 82 en route from the output of the slave turbine 74 to the input of the slave turbine compressor 70.

In some embodiments, the master recirculated gas flow 50 may be directed through the master heat recovery steam generator 36 for the generation of steam. A master steam turbine may be further configured to generate additional electricity using the steam from the master heat recovery steam generator 36, and the master steam turbine may be connected to a master steam generator. In some embodiments, the master heat recovery steam generator 36, in conjunction with the master steam turbine and the master steam generator, may be configured to generate additional electricity when the temperature of the master recirculated gas flow 50 is in the range from about 200° C. to about 700° C., from about 260° C. to about 600° C., or from about 300° C. to about 550° C. In some embodiments, the master steam turbine may be connected to the master turbine shaft 22.

In some embodiments, the slave recirculated gas flow 90 may be directed through the slave heat recovery steam generator 76 for the generation of steam. A slave steam turbine may be further configured to generate additional electricity using the steam from the slave heat recovery steam generator 76, and the slave steam turbine may be connected to a slave steam generator. In some embodiments, the slave heat recovery steam generator 76, in conjunction with the slave steam turbine and the slave steam generator, may be configured to generate additional electricity when the temperature of the slave recirculated gas flow 90 is in the range from about 200° C. to about 700° C., from about 260° C. to about 600° C., or from about 300° C. to about 550° C. In some embodiments, the slave steam turbine may be connected to the slave turbine shaft 62.

An excess portion of the master recirculated gas flow 50 may be vented from the master gas turbine assembly at a location between an output of the master turbine compressor 30 and an input to the master turbine compressor 30. The venting step may be used to prevent over-pressurization of the master gas turbine assembly. In some embodiments, the venting step may be used to reduce the pressure of the master recirculated gas flow 50 that is delivered from the master turbine compressor 30 to the master turbine combustor 32. In some embodiments, the method of venting may further comprise opening a master damper door 38, which may be fluidly connected to the master recirculation loop 52, to the atmosphere. In some embodiments, an excess portion of the master recirculated gas flow 50 may be vented from the master bypass conduit 49.

An excess portion of the slave recirculated gas flow 90 may be vented from the slave gas turbine assembly at a location between an output of the slave turbine compressor 70 and an input to the slave turbine compressor 70. The venting step may be used to prevent over-pressurization of the slave gas turbine assembly. In some embodiments, the venting step may be used to reduce the pressure of the slave recirculated gas flow 90 that is delivered from the slave turbine compressor 70 to the slave turbine combustor 72. In some embodiments, the method of venting may further comprise opening a slave damper door 78, which may be fluidly connected to the slave recirculation loop 92, to the atmosphere. In some embodiments, an excess portion of the slave recirculated gas flow 90 may be vented from the slave bypass conduit 89.

In some embodiments, at least a portion of an exhaust of the master turbine compressor 30 may bypass the master turbine combustor 32 via the master bypass conduit 49. As used herein, the "exhaust" of the master turbine compressor 30 is an output of the master recirculated gas flow 50 from the master turbine compressor 30. Additionally, the master bypass conduit 49 may deliver the master bypass flow to the master recirculation loop 52 downstream of the master turbine 34. In some embodiments, the exhaust of the master turbine compressor 30 may bypass the master turbine combustor 32 as a master bypass flow having a master bypass flow rate, wherein the master bypass flow rate may be adjusted. In some embodiments, the master bypass conduit 49 may be used to bypass the master turbine combustor 32 with at least a second portion of the master recirculated gas flow 50. In some embodiments, the master bypass flow rate may be adjusted using the master turbine bypass valve 47. In some embodiments, the master turbine bypass valve 47 may be configured to deliver the master bypass flow with the master bypass flow rate in the range of about 20% to about 80%, from about 30% to about 70%, or from about 40% to about 60% of the output flow rate of the master turbine compressor 30.

In some embodiments, at least a portion of an exhaust of the slave turbine compressor 70 may bypass the slave turbine combustor 72 via the slave bypass conduit 89. As used herein, the "exhaust" of the slave turbine compressor 70 is an output of the slave recirculated gas flow 90 from the slave turbine compressor 70. Additionally, the slave bypass conduit 89 may deliver the slave bypass flow to the slave recirculation loop 92 downstream of the slave turbine 74. In some embodiments, the exhaust of the slave turbine compressor 70 may bypass the slave turbine combustor 72 as a slave bypass flow having a slave bypass flow rate, wherein the slave bypass flow rate may be adjusted. In some embodiments, the slave bypass conduit 89 may be used to bypass the slave turbine combustor 72 with at least a second portion of the slave recirculated gas flow 90. In some embodiments, the slave bypass flow rate may be adjusted using the slave turbine bypass valve 87. In some embodiments, the slave turbine bypass valve 87 may be configured to deliver the slave bypass flow with the slave bypass flow rate in the range of about 20% to about 80%, from about 30% to about 70%, or from about 40% to about 60% of the output flow rate of the slave turbine compressor 70.

In some embodiments, a portion of the master bypass flow into the master bypass conduit 49 may be extracted as a master extraction flow 48 and may be regulated by a master extraction valve 45. In some embodiments, the master extraction valve 45 may be fluidly connected to the master bypass conduit 49 at a point that is either upstream of or downstream of the master turbine bypass valve 47. In some embodiments, the master extraction flow 48 may be used for a secondary process. In some embodiments, the master extraction flow 48 may be delivered to a master gas separation system. In some embodiments, the master extraction valve 45 may be fluidly connected to a master gas separation system such as a carbon capture sequestration (CCS) system via the master extraction flow 48. In still other embodiments, the master gas separation system may produce a stream of concentrated carbon dioxide and concentrated nitrogen, both with a low oxygen content.

In some embodiments, a portion of the slave bypass flow into the slave bypass conduit 89 may be extracted as a slave extraction flow 88 and may be regulated by a slave extraction valve 85. In some embodiments, the slave extraction valve 85 may be fluidly connected to the slave bypass conduit 89 at a point that is either upstream of or downstream of the slave turbine bypass valve 87. In some embodiments, the slave extraction flow 88 may be used for a secondary process. In some embodiments, the slave extraction flow 88 may be delivered to a slave gas separation system. In some embodiments, the slave extraction valve 85 may be fluidly connected to a slave gas separation system such as a carbon capture sequestration (CCS) system via the slave extraction flow 88. In still other embodiments, the slave gas separation system may produce a stream of concentrated carbon dioxide and concentrated nitrogen, both with a low oxygen content.

In some embodiments, the at least a first portion of the compressed ambient gas flow 26 may be delivered to the master turbine combustor 32 at a pressure that may be substantially equal to an output pressure from the master turbine compressor 30 to the master turbine combustor 32. As used herein, the term "substantially equal" means a pressure difference that is less than about 10%, less than about 5%, or less than about 1%. In some embodiments, the at least a first portion of the compressed ambient gas flow 26 may be delivered to the master turbine combustor 32 at a pressure that may be greater than or substantially equal to an output pressure from the master turbine compressor 30 to the master turbine combustor 32.

In some embodiments, the at least a second portion of the compressed ambient gas flow 66 may be delivered to the slave turbine combustor 72 at a pressure that may be substantially equal to an output pressure from the slave turbine compressor 70 to the slave turbine combustor 72. As used herein, the term "substantially equal" means a pressure difference that is less than about 10%, less than about 5%, or less than about 1%. In some embodiments, the at least a second portion of the compressed ambient gas flow 66 may be delivered to the slave turbine combustor 72 at a pressure that may be greater than or substantially equal to an output pressure from the slave turbine compressor 70 to the slave turbine combustor 72.

In some embodiments, the master turbine shaft 22 may connect the master turbine 34 to the master turbine compressor 30. Under constant speed no load operation, the master turbine power that is produced by burning the master combustible mixture may be substantially equal to the power necessary to rotate the master turbine compressor 30. In other embodiments, the master turbine shaft 22 may further connect to the main air compressor 12, wherein the master turbine power that is produced by burning the master combustible mixture may be substantially equal to the power necessary to rotate both the master turbine compressor 30 and the main air compressor 12.

In some embodiments, the slave turbine shaft 62 may connect the slave turbine 74 to the slave turbine compressor 70. Under constant speed no load operation, the slave turbine power that is produced by burning the slave combustible mixture may be substantially equal to the power necessary to rotate the slave turbine compressor 70.

In some embodiments, the master gas turbine assembly may further comprise a master secondary flow path 31 that may deliver at least a third portion of the master recirculated gas flow 50 from the master turbine compressor 30 to the master turbine 34 as a master secondary flow. The master secondary flow may be used to cool and to seal the master turbine 34, including individual components of the master turbine 34 such as the turbine shroud, the turbine nozzle, the turbine blade tip, the turbine bearing support housing, and the like. After cooling and sealing the master turbine 34 and any individual master turbine components, the master secondary flow may be directed into the master recirculation loop 52 downstream of the master turbine 34.

In some embodiments, the slave gas turbine assembly may further comprise a slave secondary flow path 71 that may deliver at least a third portion of the slave recirculated gas flow 90 from the slave turbine compressor 70 to the slave turbine 74 as a slave secondary flow. The slave secondary flow may be used to cool and to seal the slave turbine 74, including individual components of the slave turbine 74 such as the turbine shroud, the turbine nozzle, the turbine blade tip, the turbine bearing support housing, and the like. After cooling and sealing the slave turbine 74 and any individual slave turbine components, the slave secondary flow may be directed into the slave recirculation loop 92 downstream of the slave turbine 74.

In still other embodiments, a method for operating the exemplary power plant configuration 100 at constant speed no load is provided and may further include the use of the master booster compressor 24 which may be incorporated downstream of and in fluid connection with the main air compressor 12 and upstream of and in fluid connection with the master turbine combustor 32. The master booster compressor 24 may further compress the at least a first portion of the compressed ambient gas flow 26 before delivery into the master turbine combustor 32. The exhaust of the master booster combustor 24 may be delivered to the master turbine combustor 32. In some embodiments, the exhaust of the master booster compressor 24 may be regulated by the master air injection valve 25.

In some embodiments, a method for operating the exemplary power plant configuration 100 at constant speed no load is provided and may further include the use of the slave booster compressor 64 which may be incorporated downstream of and in fluid connection with the main air compressor 12 and upstream of and in fluid connection with the slave turbine combustor 72. The slave booster compressor 64 may further compress the at least a second portion of the compressed ambient gas flow 66 before delivery into the slave turbine combustor 72. The exhaust of the slave booster combustor 64 may be delivered to the slave turbine combustor 72. In some embodiments, the exhaust of the slave booster compressor 64 may be regulated by the slave air injection valve 65.

In some embodiments, the method comprises operating a power plant arrangement at constant speed no load that comprises two gas turbine assemblies that are fluidly connected by the inter-train conduit 19. In some embodiments, both a master gas turbine assembly and a slave gas turbine assembly may be operated at the same constant speed. In other embodiments, a master and one or more slave gas turbine assemblies may each be operated at a different constant speed. In still other embodiments, the method comprises operating a power plant arrangement that comprises three or more gas turbine assemblies and one or more additional main air compressors, wherein the additional main air compressors are in fluid connection with each other and with the gas turbine assemblies. In yet other embodiments, the method comprises operating a power plant arrangement that is configured for substantially stoichiometric combustion. In still other embodiments, the method comprises operating a power plant arrangement that is configured for substantially zero emissions power production.

Other configurations and methods of operation are provided by U.S. patent applications including "Power Plant and Method of Use" to Daniel Snook, Lisa Wichmann, Sam Draper, and Noemie Dion Ouellet (filed Aug. 25, 2011), "Power Plant and Method of Operation" to Daniel Snook, Lisa Wichmann, Sam Draper, Noemie Dion Ouellet, and Scott Rittenhouse (filed Aug. 25, 2011), "Power Plant Start-Up Method" to Daniel Snook, Lisa Wichmann, Sam Draper, Noemie Dion Ouellet, and Scott Rittenhouse (filed Aug. 25, 2011), "Power Plant and Control Method" to Daniel Snook, Lisa Wichmann, Sam Draper, and Noemie Dion Ouellet (filed Aug. 25, 2011), "Power Plant and Method of Operation" to Predrag Popovic (filed Aug. 25, 2011), "Power Plant and Method of Operation" to Sam Draper and Kenneth Kohl (filed Aug. 25, 2011), "Power Plant and Method of Operation" to Sam Draper (filed Aug. 25, 2011), "Power Plant and Method of Operation" to Sam Draper (filed Aug. 25, 2011), "Power Plant and Method of Operation" to Lisa Wichmann (filed Aug. 25, 2011), and "Power Plant and Control Method" to Karl Dean Minto (filed Aug. 25, 2011), the disclosures of which are incorporated by reference herein.

It should be apparent that the foregoing relates only to the preferred embodiments of the present invention and that numerous changes and modifications may be made herein without departing from the spirit and the scope of the invention as defined by the following claims and equivalents thereof.

We claim:

1. A method for operating a power plant at constant speed no load, comprising:
    compressing ambient air with at least one main air compressor to make a compressed ambient gas flow;
    delivering at least a first portion of the compressed ambient gas flow having a first compressed ambient gas flow rate from the at least one main air compressor to a master turbine combustor at a pressure that is greater than or substantially equal to an output pressure delivered to the master turbine combustor from a master turbine compressor as at least a first portion of a master recirculated gas flow having a master recirculated gas flow rate;
    delivering at least a second portion of the compressed ambient gas flow having at least a second compressed ambient gas flow rate from the at least one main air compressor to at least one slave turbine combustor at a pressure that is greater than or substantially equal to an output pressure delivered to the at least one slave turbine combustor from at least one slave turbine compressor as at least a first portion of a slave recirculated gas flow having at least one slave recirculated gas flow rate;
    delivering a master fuel stream to the master turbine combustor with a master fuel flow rate, wherein the master fuel flow rate, the first compressed ambient gas flow rate, and the master recirculated gas flow rate are sufficient to maintain combustion;
    delivering at least one slave fuel stream to the at least one slave turbine combustor with at least one slave fuel flow rate, wherein the at least one slave fuel flow rate, the at least one second compressed ambient gas flow rate, and the at least one slave recirculated gas flow rate are sufficient to maintain combustion;
    mixing the at least a first portion of the compressed ambient gas flow with the at least a first portion of a master recirculated gas flow and with the master fuel stream in the master turbine combustor to form a master combustible mixture;
    mixing the at least a second portion of the compressed ambient gas flow with the at least a first portion of the at least one slave recirculated gas flow and with the at least one slave fuel stream in the at least one slave turbine combustor to form at least one slave combustible mixture;
    burning the master combustible mixture in the master turbine combustor to form the master recirculated gas flow;
    burning the at least one slave combustible mixture in the at least one slave turbine combustor to form the at least one slave recirculated gas flow;
    driving a master turbine connected to the master turbine combustor using the master recirculated gas flow, such that the master turbine and a master turbine compressor rotate, and produce a master turbine power that is substantially equal to at least a power required to rotate the mater turbine compressor;
    driving at least one slave turbine connected to the at least one slave turbine combustor using the at least one slave recirculated gas flow, such that the at least one slave turbine and at least one slave turbine compressor rotate, and produce at least one slave turbine power that is substantially equal to a power required to rotate the at least one slave turbine compressor;
    recirculating at least a portion of the master recirculated gas flow through a master recirculation loop, wherein the at least a portion of the master recirculated gas flow is recirculated from the master turbine to the master turbine compressor;
    recirculating at least a portion of the at least one slave recirculated gas flow through a slave recirculation loop, wherein the at least a portion of the at least one slave recirculated gas flow is recirculated from the at least one slave turbine to the at least one slave turbine compressor;
    bypassing the master turbine combustor with at least a second portion of the master recirculated gas flow as a master bypass flow having a master bypass flow rate and adjusting the master bypass flow rate or venting an excess portion of the master recirculated gas flow between an output of the master turbine compressor and an input to the master turbine compressor or both; and bypassing the at least one slave turbine combustor with at least a second portion of the at least one slave recirculated gas flow as at least one slave bypass flow having at least one slave bypass flow rate and adjusting the at least one slave bypass flow rate or venting an excess portion of the at least one slave recirculated gas flow between an output of the at least one slave turbine compressor and an input to the at least one slave turbine compressor or both; and operating the power plant in start-up mode at constant speed no load.

2. The method of claim 1, further comprising:

delivering the at least a first portion of the compressed ambient gas flow from the at least one main air compressor to a master booster compressor, wherein the master booster compressor is fluidly connected to the downstream side of the at least one main air compressor and fluidly connected to the upstream side of the master turbine combustor, and delivering a master booster compressor exhaust to the master turbine combustor; and delivering the at least a second portion of the compressed ambient gas flow from the at least one main air compressor to at least one slave booster compressor, wherein the at least one slave booster compressor is fluidly connected to the downstream side of the at least one main air compressor and fluidly connected to the upstream side of the at least one slave turbine combustor, and delivering at least one slave booster compressor exhaust to the at least one slave turbine combustor.

3. The method of claim 1, further comprising:

delivering a master secondary flow through a master secondary flow path, wherein the master secondary flow path delivers at least a third portion of the master recirculated gas flow from the master turbine compressor to the master turbine for cooling and sealing the master turbine and thereafter into the master recirculation loop; and delivering at least one slave secondary flow through at least one slave secondary flow path, wherein the at least one slave secondary flow path delivers at least a third portion of the at least one slave recirculated gas flow from the at least one slave turbine compressor to the at least one slave turbine for cooling and sealing the at least one slave turbine and thereafter into the at least one slave recirculation loop.

4. The method of claim 1, further comprising adjusting a plurality of inlet guide vanes of the at least one main air compressor to regulate the pressure of the at least a first portion of the compressed ambient gas flow that is delivered to the master turbine combustor.

5. The method of claim 1, further comprising:

adjusting a plurality of inlet guide vanes of the master turbine compressor to regulate the output pressure delivered to the master turbine combustor from the master turbine compressor as the at least a first portion of a master recirculated gas flow; and adjusting a plurality of inlet guide vanes of the at least one slave turbine compressor to regulate the output pressure delivered to the at least one slave turbine combustor from the at least one slave turbine compressor as the at least a first portion of a slave recirculated gas flow.

6. The method of claim 1, further comprising adjusting the master fuel flow rate, the slave fuel flow rate, or both.

7. The method of claim 1, further comprising:

Adjusting the master bypass flow rate such that the output pressure delivered to the master turbine combustor from the master turbine compressor is less than or equal to the pressure of the at least a first portion of the compressed ambient gas flow delivered to the master combustor from the at least one main air compressor; and adjusting the at least one slave bypass flow rate such that the output pressure delivered to the at least one slave turbine combustor from the at least one slave turbine compressor is less than or equal to the pressure of the at least a second portion of the compressed ambient gas flow delivered to the at least one slave turbine combustor from the at least one main air compressor.

8. The method of claim 1, wherein the at least one main air compressor is driven by rotation of a master turbine shaft that is mechanically connected to the master turbine and the master turbine compressor.

9. The method of claim 8, wherein the master turbine power is substantially equal to the power required to rotate the master turbine compressor and a power required to drive the at least one main air compressor.

10. The method of claim 1, further comprising:

passing the master recirculated gas flow from the master turbine to a master heat recovery steam generator in the master recirculation loop, wherein the master heat recovery steam generator is configured to generate electricity using a master steam turbine and a master steam generator; and passing the at least one slave recirculated gas flow from the slave turbine to a slave heat recovery steam generator in the slave recirculation loop, wherein the slave heat recovery steam generator is configured to generate electricity using a slave steam turbine and a slave steam generator.

11. The method of claim 1, further comprising:

venting an excess portion, if any, of the at least a first portion of the compressed ambient gas flow between an output of the at least one main air compressor and an input of the master turbine combustor; and venting an excess portion, if any, of the at least a second portion of the compressed ambient gas flow between an output of the at least one main air compressor and an input of the at least one slave turbine combustor.

12. The method of claim 1, wherein:

the master bypass flow is fluidly connected to and delivered to the master recirculation loop downstream of the master turbine; and the at least one slave bypass flow is fluidly connected to and delivered to the at least one slave recirculation loop downstream of the at least one slave turbine.

13. The method of claim 1, wherein:

the master bypass flow is fluidly connected to a master extraction valve and at least a portion of the master bypass flow is delivered to at least one master secondary process; and the at least one slave bypass flow is fluidly connected to at least one slave extraction valve and at least a portion of the at least one slave bypass flow is delivered to at least one slave secondary process.

14. A method for operating a power plant, comprising:

compressing ambient air with at least one main air compressor to make a compressed ambient gas flow;

delivering at least a first portion of the compressed ambient gas flow from the at least one main air compressor to a master turbine combustor;

delivering at least a second portion of the compressed ambient gas flow from the at least one main air compressor to at least one slave turbine combustor;

mixing the at least a first portion of the compressed ambient gas flow with at least a first portion of a master recirculated gas flow and with a master fuel stream to form a master combustible mixture in the master turbine combustor;

mixing the at least a second portion of the compressed ambient gas flow with at least a first portion of at least one slave recirculated gas flow and with at least one slave fuel stream to form at least one slave combustible mixture in the at least one slave turbine combustor;

burning the master combustible mixture in the master turbine combustor to form the master recirculated gas flow;

burning the at least one slave combustible mixture in the at least one slave turbine combustor to form the at least one slave recirculated gas flow;

driving a master turbine connected to the master turbine combustor using the master recirculated gas flow, such that the master turbine and a master turbine compressor rotate, and produce a master turbine power;

driving at least one slave turbine connected to the at least one slave turbine combustor using the at least one slave recirculated gas flow, such that the at least one slave turbine and at least one slave turbine compressor rotate, and produce at least one slave turbine power;

recirculating at least a portion of the master recirculated gas flow through a master recirculation loop, wherein the at least a portion of the master recirculated gas flow is recirculated from the master turbine to the master turbine compressor;

recirculating at least a portion of the at least one slave recirculated gas flow through at least one slave recirculation loop, wherein the at least a portion of the at least one slave recirculated gas flow is recirculated from the at least one slave turbine to the at least one slave turbine compressor;

bypassing the master turbine combustor with at least a second portion of the master recirculated gas flow as a master bypass flow having a master bypass flow rate and adjusting the master bypass flow rate or venting an excess portion, if any, of the master recirculated gas flow between an output of the master turbine compressor and an input to the master turbine compressor or both; and bypassing the at least one slave turbine combustor with at least a second portion of the at least one slave recirculated gas flow as at least one slave bypass flow having at least one slave bypass flow rate and adjusting the at least one slave bypass flow rate or venting an excess portion, if any, of the at least one slave recirculated gas flow between an output of the at least one slave turbine compressor and an input to the at least one slave turbine compressor or both.

15. The method of claim 14, further comprising:

delivering the at least a first portion of the compressed ambient gas flow from the at least one main air compressor to a master booster compressor, wherein the master booster compressor is fluidly connected to the downstream side of the at least one main air compressor and is fluidly connected to the upstream side of the master turbine combustor, and delivering a master booster compressor exhaust to the master turbine combustor; and delivering the at least a second portion of the compressed ambient gas flow from the at least one main air compressor to at least one slave booster compressor, wherein the at least one slave booster compressor is fluidly connected to the downstream side of the at least one main air compressor and is fluidly connected to the upstream side of the at least one slave turbine combustor, and delivering at least one slave booster compressor exhaust to the at least one slave turbine combustor.

16. The method of claim 14, further comprising:

delivering a master secondary flow through a master secondary flow path, wherein the master secondary flow path delivers at least a third portion of the master recirculated gas flow from the master turbine compressor to the master turbine for cooling and sealing the master turbine and thereafter into the master recirculation loop; and delivering at least one slave secondary flow through at least one slave secondary flow path, wherein the at least one slave secondary flow path delivers at least a third portion of the at least one slave recirculated gas flow from the at least one slave turbine compressor to the at least one slave turbine for cooling and sealing the at least one slave turbine and thereafter into the at least one slave recirculation loop.

17. The method of claim 14, wherein:

the master bypass flow is fluidly connected to and delivered to the master recirculation loop downstream of the master turbine; and the at least one slave bypass flow is fluidly connected to and delivered to the at least one slave recirculation loop downstream of the at least one slave turbine.

18. The method of claim 14, further comprising:

venting an excess portion, if any, of the at least a first portion of the compressed ambient gas flow between an output of the at least one main air compressor and an input of the master turbine combustor; and venting an excess portion, if any, of the at least a second portion of the compressed ambient gas flow between an output of the at least one main air compressor and an input of the at least one slave turbine combustor.

19. The method of claim 14, wherein:

the master turbine power is used to rotate a master turbine shaft configured to generate electricity when rotated in a master turbine generator; and the at least one slave turbine power is used to rotate at least one slave turbine shaft configured to generate electricity when rotated in at least one slave turbine generator.

20. The method of claim 19, wherein electricity is generated using substantially stoichiometric combustion.

* * * * *